May 13, 1969   T. W. DICKINSON   3,443,847
OFFSET WELDED RETAINER RINGS AND BEARINGS
Filed Dec. 29, 1966   Sheet 1 of 2

INVENTOR.
THORN W. DICKINSON
BY
Hopgood & Calimafde
ATTORNEYS.

May 13, 1969  T. W. DICKINSON  3,443,847
OFFSET WELDED RETAINER RINGS AND BEARINGS
Filed Dec. 29, 1966  Sheet 2 of 2

INVENTOR.
THORN W. DICKINSON
BY
Hopgood & Calimafde
ATTORNEYS.

United States Patent Office 3,443,847
Patented May 13, 1969

3,443,847
OFFSET WELDED RETAINER RINGS AND BEARINGS
Thorn W. Dickinson, Berlin, Conn., assignor, by mesne assignments, to Textron, Inc., Providence, R.I., a corporation of Delaware
Filed Dec. 29, 1966, Ser. No. 605,681
Int. Cl. F16c *19/20, 33/38*
U.S. Cl. 308—201                                    1 Claim

ABSTRACT OF THE DISCLOSURE

This invention relates to the retainer elements in a bearing. Two retainer rings are joined to each other between rolling elements substantially along the edges.

---

This invention relates to an improvement in retainer fastening in maximum-type bearings. This invention relates more specifically to a ball bearing having a welded retainer ring. More particularly, it relates to a retainer ring having the weld offset or moved outwardly to one of the edges of the ring and a method for making a ball bearing having an offset welded retainer ring.

By a maximum-type bearing, I mean one which is capable of carrying considerably heavier radial loads for a given bore size and is also capable of withstanding heavier shock loads. In such a gearing, the maximum number of balls are employed. In general, there are no sections of the retainer rings between the balls which would limit the maximum complement.

Because of the close ball-to-ball proximity in maximum-type bearings, it has been difficult to achieve effective fastening techniques between the two half retainer rings. In one form of prior-art ball retainer structure, the finger-type fastener, the fingers of one half are crimped over the other half; here it is not possible because of the close ball spacing to have the one half ring positively abut the other half.

Other maximum-type retainer structures utilize extra parts such as stay rods to connect the two halves together.

Ball bearing retainer rings for bearings with a conrad complement of balls are fastened together mechanically either by riveting two halves together or by using crimping fingers extending from one ring for bending over the other ring, as discussed in the patent application Ser. No. 448,511, filed Apr. 15, 1965, by Henry Hubbell, now U.S. Patent No. 3,313,582.

Welded retainer rings are discussed in the aforesaid patent application in which the retainer rings have recessed and flat sections, the recessed sections accommodating the balls and the flat sections being used for welding. While such a retainer ring has substantially increased strength, it is apparent that the peripheral space occupied by the flats limits the maximum complement of balls that can be used for a particular diameter retainer ring.

My invention is an improvement over presently used methods insofar as my invention provides a stronger fastening and allows a maximum complement of balls.

It is an object, therefore, to provide a bearing having a maximum complement of balls held between retainer rings united at offset abutting portions.

It is a further object to provide a maximum complement ball bearing having a stronger union between retainer rings.

It is a further object of this invention to provide a bearing and a method for making such bearing, having a welded retainer ring having the weld outwardly offset from the pitch diameter of the balls.

It is a further object of this invention to provide a method of making a bearing in which the balls are inserted between the retainer rings and therefater the rings are welded together.

Briefly, in my invention, I provide a ball bearing having two-half retainer rings to receive a maximum complement of balls. Each retainer ring has a flat section between the ball pockets. These flat sections are outwardly offset from the pitch diameter of the balls. These flat sections abut each other and are strongly united by welding.

These and other objects, features and advantages of this invention and the manner of attaining them will become more apparent and the invention itself will be best understood by reference to the following description of the invention taken in conjunction with the accompanying drawings, in which.

Figure 1:
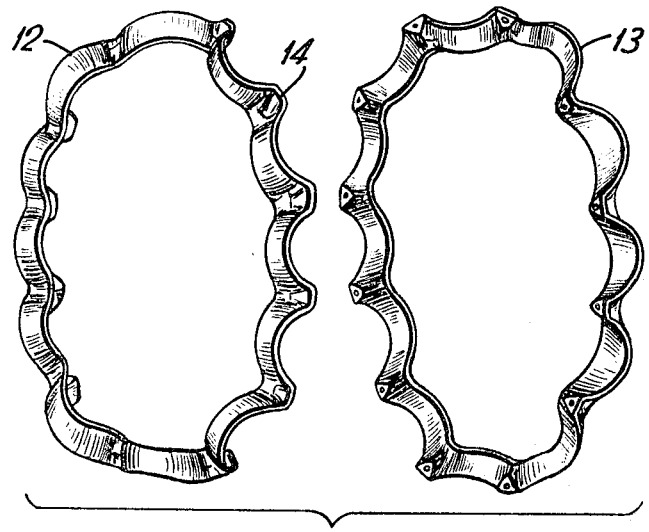
FIG. 1 is a perspective drawing of the two separate components of the retainer ring.
Figure 2:
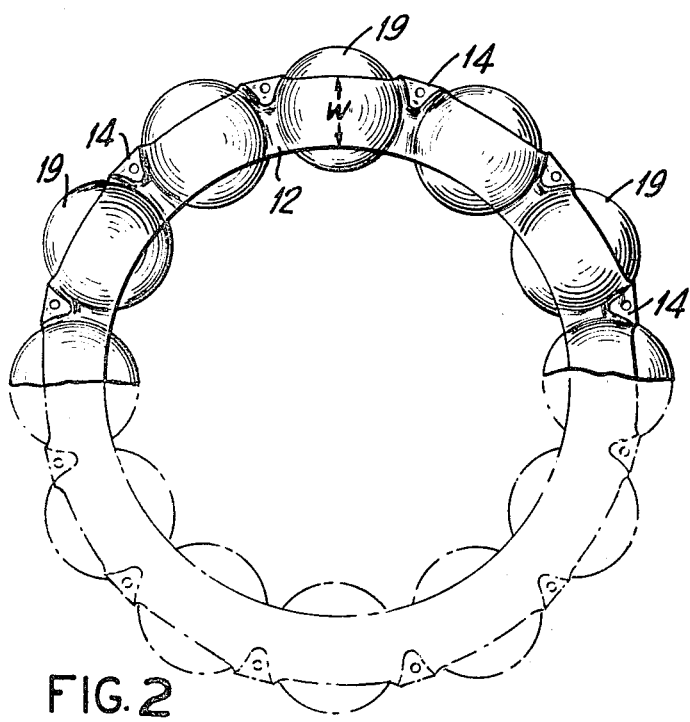
FIG. 2 is a side view of the welded steel ballbearing retainer ring containing a complement of bearing balls.

Referring now to the drawings, there is shown in FIG. 1, a cage comprising two rings 12 and 13 made of flat metal having formed pockets to receive the rolling elements. In this embodiment, the rolling elements are balls 19. The pockets have sufficient width and curvature to prevent the balls from falling out. The balls are shown between the flat sections 14 in FIGS. 2 and 4. The balls are retained in place by providing abutting flat sections 14 offset from the center of the rings which is the same as the pitch diameter of the balls. This allows the balls to be spaced relatively closer to one another. The flat surfaces are welded together in the preferred embodiment as described herein.

Figure 4:
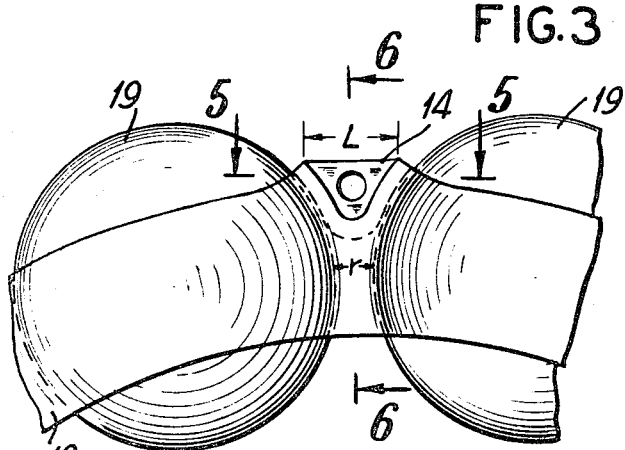
FIG. 4 is an enlarged front view showing the welded area with respect to the balls.

As shown in FIG. 4, the weld area is generally triangular, located generally adjacent one edge of the ring and having its vertex intermediate between the outer and inner sides of the ring. As shown, in FIG. 4, the balls are closest in the direction of the vertex and their spacing is less than the length L of the flat at the longest portion.

The preferred embodiment is illustrated in FIGS. 5–8, in which the method of projection welding is utilized. This method is disclosed in more detail in the copending application filed by Henry Hubbell, Ser. No. 448,511, entitled: "Method of Welding Retainer Rings." However, this invention is not limited to a specific form of welding.

Figure 7:
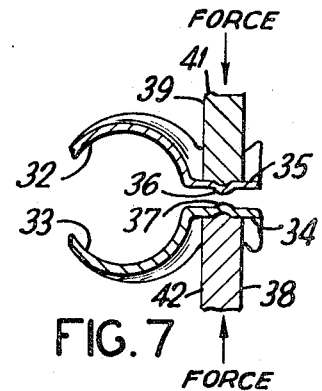
FIGS. 7 and 8 are diagrammatic illustrations of the welding operation.
Figure 5:
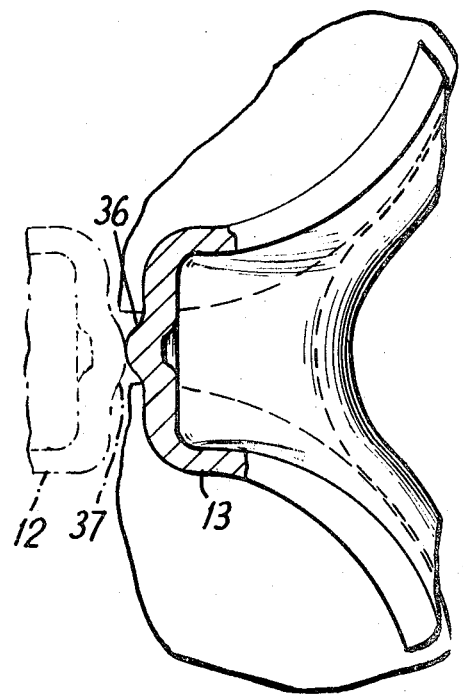
FIG. 5 is a sectional view along line 5—5 of FIG. 4.

This method comprises placing spaced projections, e.g. embossments or small dimples on each of the retainer halves at the flat areas to be welded. The two halves are then aligned together with their respective projections touching each other at their convex portions and the whole retainer welded by applying pressure and welding current simultaneously at each of the projections which flatten out substantially and diffuse into each other. The welding may be carried out with the parts submerged in oil in order to minimize heat marks. As illustrative of this method, reference is made to FIGS. 5, 7 and 8 which depict diagrammatically the preferred welding method. In FIGS. 5 and 7, a fragment of two retainer halves is shown comprising ball-receiving pockets 32, 33 oppositely disposed to each other, and flat portions 34, 35 aligned with projections 36, 37 facing each other. Electrodes, not shown, are positioned normal to the flat portions of the retainer halves with the force applied against the projections from the top and bottom, the projections being fused together to form a nugget 40 at the center of the weld (see also FIG. 6).

Figure 8:
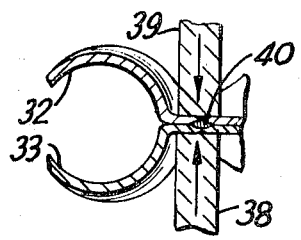
Figure 9:
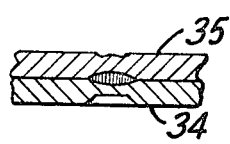
FIG. 9 is a sectional view illustrating the weld.
Figure 3:
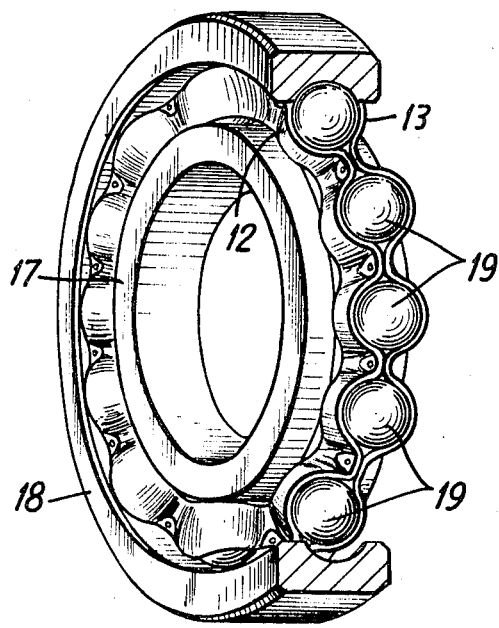
FIG. 3 is a perspective drawing partially cutaway of the retainer ring and complement of FIG. 2.

In actual practice, the two retainer halves are welded together at all of the projections simultaneously utilizing a welding electrode assembly of the type shown diagrammatically in FIGS. 7 and 8 comprising hydraulic rams or pistons 41, 42. Ram 41 has extending downwardly from it a cylindrical electrode assembly having a plurality of projecting electrode contacting points, while ram 42 has extending upwardly from it an electrode assembly also having projecting electrode contacting points between which the assembled retainer ring is supported. A source of low voltage and high current is connected to the opposed electrodes. As the rams are brought together, the retainer halves are clamped together between the electrodes and a high current passed therethrough, the current being divided equally among the projections so that welds of approximately equal strength are produced. When properly welded, the projections are flattened sufficiently, whereby the end result represents spot welds.

Figure 6:
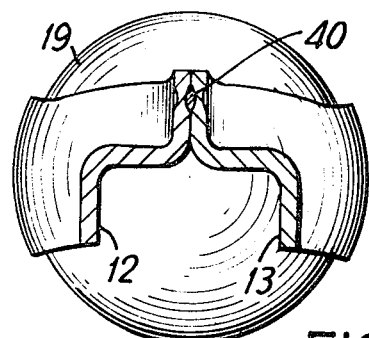
FIG. 6 is a sectional view along line 6—6 of FIG. 4.

In the preferred embodiment utilizing steel retainers, the carbon content at the surface of the weld area is kept below 0.06% by weight of carbon, a weld nugget 40 of the type shown in FIG. 6 is obtained which is generally indicative of good strength. It will be apparent that the radius of the center line of the balls may be decreased and yet provide the same number of balls with a conventional welded retainer ring. This is because most of the periphery, drawn through the center line of the balls, is utilized. Alternatively, if the radius of the retainer is to remain standard, then a greater number of balls may be utilized. It will be apparent that the peripheral arc of the retainer ring allowed for ball separation is minimized and may have a dimension which is less than the actual dimension of the weld. For example, as shown in FIG. 4, the spacing between the balls is represented by $r$ while the corresponding length of the weld is designated by $L$ and it is apparent that $L$ is greater than $r$.

The foregoing method has been described in connection with the welding of steel retainers, however, the invention is not to be limited to any specific metal used as the retainer halves.

While the principles of the invention have been described in connection with specific apparatus, it is to be clearly understood that this description is made only by way of example and not as a limitation to the scope of the invention as set forth in the objects thereof and in the accompanying claim.

What I claim is:

1. An anti-friction bearing having an outer raceway member, an inner raceway member and a complement of rolling elements engaging said raceways and retained therein by an annular carbon steel retainer comprising two retainer rings having pockets confining said elements, said rings being united by welds at abutting flat surfaces of the rings between said pockets, the carbon content of the steel at the welds not exceeding about 0.06% by weight, said welded flat surfaces being offset radially outward from the pitch line of the rolling elements and substantially adjacent to the outward edge of the rings, the spacing between the pockets being less than the maximum dimension of the welded offset, thereby providing a maximum complement of rolling elements capable of carrying heavier radial loads.

References Cited

UNITED STATES PATENTS

| 1,733,673 | 10/1929 | Rouanet | 308—201 |
| 3,313,582 | 4/1967 | Hubbell | 308—201 |
| 1,533,185 | 4/1925 | Gurney | 308—201 |

FOREIGN PATENTS

| 276,450 | 7/1914 | Germany. |
| 368,315 | 2/1923 | Germany. |

MARTIN P. SCHWADRON, *Primary Examiner.*

FRANK SUSKO, *Assistant Examiner.*